United States Patent
Tamaura et al.

(10) Patent No.: US 8,726,899 B2
(45) Date of Patent: May 20, 2014

(54) SOLAR LIGHT CONDENSING SYSTEM

(75) Inventors: Yutaka Tamaura, Meguro-ku (JP);
Hiroshi Hasuike, Meguro-ku (JP)

(73) Assignee: Tokyo Institute of Technology, Tokyo (JP)

( * ) Notice: Subject to any disclaimer, the term of this patent is extended or adjusted under 35 U.S.C. 154(b) by 84 days.

(21) Appl. No.: 13/392,187

(22) PCT Filed: Aug. 11, 2010

(86) PCT No.: PCT/JP2010/063615
§ 371 (c)(1),
(2), (4) Date: May 15, 2012

(87) PCT Pub. No.: WO2011/024647
PCT Pub. Date: Mar. 3, 2011

(65) Prior Publication Data
US 2012/0227731 A1  Sep. 13, 2012

(30) Foreign Application Priority Data

Aug. 24, 2009 (JP) ................. 2009-192672

(51) Int. Cl.
*F24J 2/02* (2006.01)
*F03G 6/06* (2006.01)

(52) U.S. Cl.
USPC ........... 126/664; 126/684; 126/270; 126/680; 126/609; 60/641.8; 60/641.11; 165/67; 165/168

(58) Field of Classification Search
USPC ......... 126/664, 684–690, 680, 270, 271, 609; 60/641.8, 641.11; 165/67, 168
See application file for complete search history.

(56) References Cited

U.S. PATENT DOCUMENTS

| | | | | |
|---|---|---|---|---|
| 3,333,123 A | * | 7/1967 | Baumann | 310/11 |
| 3,780,722 A | * | 12/1973 | Swet | 126/680 |
| 3,924,604 A | * | 12/1975 | Anderson | 126/606 |
| 4,029,077 A | * | 6/1977 | Gorniak | 126/698 |
| 4,148,300 A | * | 4/1979 | Kaufman, Sr. | 126/684 |
| 4,212,290 A | * | 7/1980 | Warnken | 126/684 |
| 4,485,803 A | * | 12/1984 | Wiener | 126/591 |

(Continued)

FOREIGN PATENT DOCUMENTS

| | | |
|---|---|---|
| JP | 51-24434 A | 2/1976 |
| JP | 53-013041 A | 2/1978 |

(Continued)

*Primary Examiner* — Steven B McAllister
*Assistant Examiner* — Nikhil Mashruwala
(74) *Attorney, Agent, or Firm* — Westerman, Hattori, Daniels & Adrian, LLP

(57) ABSTRACT

Provided is a solar light concentrating system which realizes suppression of power generation costs by applying a receiver 2 that is capable of suppressing a manufacturing cost to a low level, facilitating recovery work when a failure occurs, and quickly recovering a heating medium circulating inside in case of an emergency. The receiver 2 is formed by three-dimensionally combining multiple modules 20. At least a part of the modules is a trapezoid-shaped module 20B. The trapezoid-shaped module includes an upper header 21B, a lower header 22B being shorter than the upper header, and multiple heat receiving tubes 23 which connect the two headers. The heat receiving tubes are formed by successively altering their cross-sectional shapes in away that makes each heat receiving tube shaped like a wedge that becomes narrower from its top toward its bottom in a front view, and like a wedge that becomes wider from its top toward its bottom in a side view.

6 Claims, 3 Drawing Sheets

(56) References Cited

U.S. PATENT DOCUMENTS

| | | | | |
|---|---|---|---|---|
| 5,341,870 A | * | 8/1994 | Hughes et al. | 165/110 |
| 5,694,774 A | * | 12/1997 | Drucker | 60/641.11 |
| 5,979,438 A | * | 11/1999 | Nakamura | 126/680 |
| 6,726,130 B2 | * | 4/2004 | Jaubertie | 239/589 |
| 6,793,013 B2 | * | 9/2004 | Gounder | 165/143 |
| 6,957,536 B2 | * | 10/2005 | Litwin et al. | 60/641.8 |
| 8,359,861 B2 | * | 1/2013 | Tamaura et al. | 60/641.15 |
| 2009/0173337 A1 | | 7/2009 | Tamaura et al. | |
| 2011/0094257 A1 | * | 4/2011 | Rusignuolo et al. | 62/498 |
| 2011/0197584 A1 | * | 8/2011 | Ezawa et al. | 60/641.11 |

FOREIGN PATENT DOCUMENTS

| | | |
|---|---|---|
| JP | 58-116956 U | 8/1983 |
| JP | 63-243463 A | 10/1988 |
| JP | 11-119105 A | 4/1999 |
| JP | 2951297 B2 | 9/1999 |
| JP | 2009-150360 A | 7/2009 |
| WO | WO2006/025449 A1 | 3/2006 |

\* cited by examiner

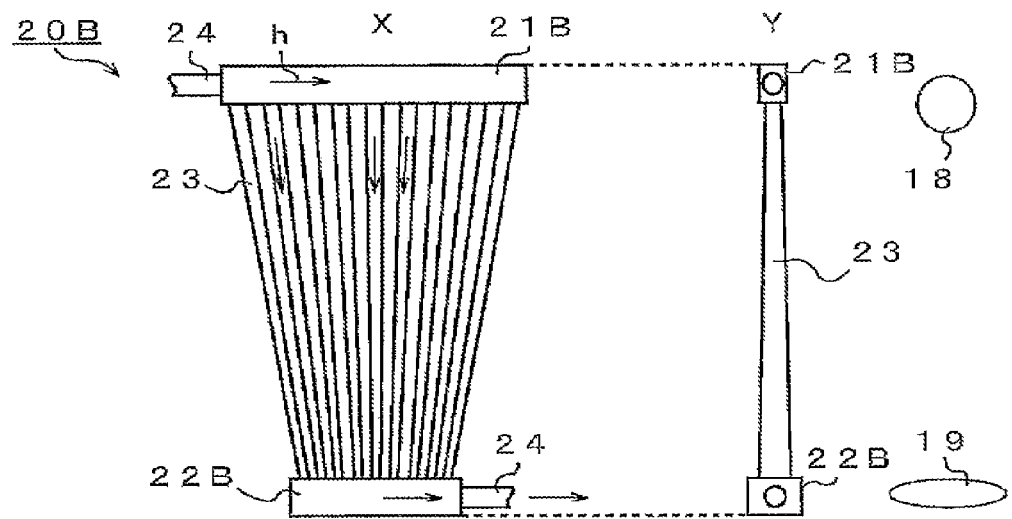
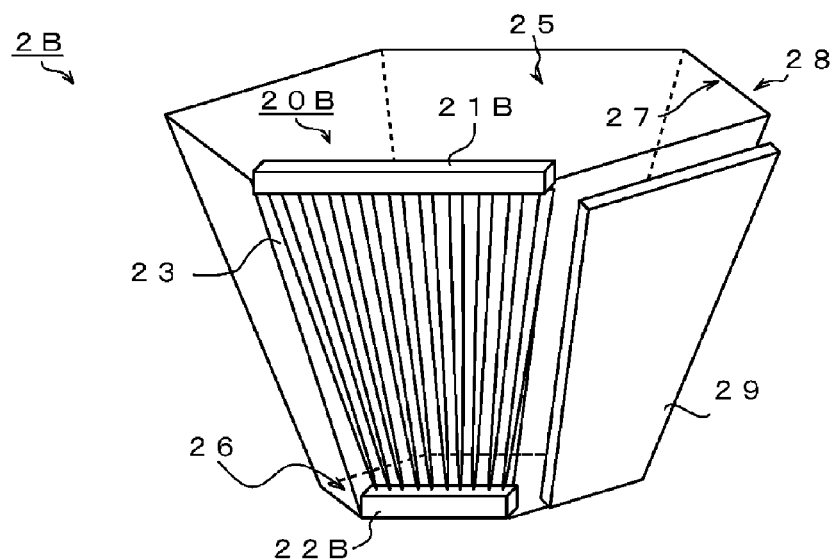

SOLAR LIGHT CONDENSING SYSTEM

CROSS-REFERENCE TO RELATED APPLICATIONS

The present patent application is a nationalization of International application No. PCT/JP2010/063615, filed Aug. 11, 2010, published in Japanese, which is based on, and claims priority from, Japanese Application No. JP2009-192672 filed Aug. 24, 2009, both of which are incorporated herein by reference in their entireties.

TECHNICAL FIELD

The present invention relates to a solar light concentrating system configured to concentrate solar light reflected off multiple heliostats (reflecting mirrors) onto a receiver (a heat receiving unit), in which a heating medium circulates in the receiver.

BACKGROUND ART

Depletion and rising prices of oil resources have been concerned about in recent years. Also, a shift from the oil resources that constitute one of the factors contributing to global warming to new energy resources has been studied. One of the new energy sources is solar thermal power generation which concentrates and uses solar light as energy.

A beam-down type solar light concentrating system is known as one of the solar light concentrating systems. The beam-down type solar light concentrating system is that which is configured to reflect the solar light to an upper part of a center part of the system by using heliostats serving as reflecting mirrors and to concentrate the reflected light onto a receiver (a heat receiving unit) installed at its lower part by using a large reflecting mirror called a center reflector (see Patent Document 1, for example).

This receiver may be formed of pipes or the like in the inside of which a heating medium (such as fused salt) circulates. In this case, the heating medium having received thermal energy from the solar light by way of the receiver is sent to a power generating unit. The power generating unit includes a power generator or the like, which is configured to generate steam by use of the heat in the heating medium, and to generate power by supplying the steam to a steam turbine.

An invention in which a heat collection receiver is formed in a pot shape (a cavity shape) is disclosed as a method of improving the efficiency of power generation utilizing this solar light concentrating system (see Patent Document 2). The invention recited in Patent Document 2 is configured to cause the solar light that enters a pot to be reflected several times so as to transfer heat efficiently to a heating medium and to retain the heat inside. This configuration significantly improves the efficiency of solar power generation.

However, because of its structure in which a single pipe is formed in the pot shape, the pot-shaped receiver recited in Cited Document 2 has problems of a great difficulty in manufacture and an increase in the manufacturing cost. Moreover, since the size of the receiver becomes huge, the receiver of an integrated type is not easy to transport, and it is a difficult task to construct the receiver on site as well.

In addition, the entire receiver needs to be replaced in case of a failure of the receiver such as pipe breakage. In this respect, in the case of constructing a beam-down type solar light concentrating system of, for example, 400 to 500 meters in each side, the diameter of the pot-shaped receiver becomes as huge as about 8 to 10 m.

Moreover, regions inside the receiver exposed to the solar light are uneven. Thus, uneven temperature distribution leads to unevenness in the amount of thermal expansion of the pipe constituting the receiver. Accordingly, the receiver has problems of causing a gap, expansion in a small space, and resulting in a failure such as a crack on the pipe as the case may be.

Further, when the receiver causes fails due to pipe breakage or the like, the receiver needs to be entirely replaced because the receiver is formed of the single pipe. Hence, the replacement involves an extensive operation. In addition, there is a problem of costly preparation of a new receiver.

Furthermore, solar light concentrating systems often use fused salt such as sodium nitrate, which turns into a liquid phase in a range of 150° C. to 500° C., as the heating medium. In a case where the fused salt is used, the fused salt needs to be removed from the receiver and transferred to a heat retention tank on a cloudy day or at night. This is because the fused salt is solidified when cooled down, and causes a clog inside the pipe of the receiver. When the fused salt is recovered, it takes time to remove the fused salt from the receiver disclosed in Cited Document 2, which includes a spiral pipe. In particular, there is a problem that the receiver cannot handle an emergency when the fused salt needs to be recovered quickly.

PRIOR ART DOCUMENTS

Patent Documents

Patent Document 1: Japanese patent No. 2951297
Patent Document 2: International Publication No. 2006/025449

SUMMARY OF THE INVENTION

Problem to be Solved by the Invention

The present invention has been made in view of the aforementioned circumstances, and an object thereof is to provide a solar light concentrating system which realizes suppression of power generation costs by applying a receiver that is capable of suppressing a manufacturing cost, a transportation cost, and a construction cost to low levels, facilitating recovery work when a failure occurs, as well as quickly recovering a heating medium circulating inside in case of an emergency.

Means for Solving the Problem

A solar light concentrating system for the purpose of achieving the foregoing object is a solar light concentrating system configured to reflect solar light off multiple heliostats to a heat receiving unit in which a heating medium circulates, and to extract energy from the heating medium, characterized in that: the heat receiving unit is formed by three-dimensionally combining multiple modules, in which at least a part of the modules is a trapezoid-shaped module; the trapezoid-shaped module includes an upper header, a lower header being shorter than the upper header, and multiple heat receiving tubes configured to connect the two headers together; the heat receiving tubes are formed by successively altering their cross-sectional shapes in a way that makes each heat receiving tube shaped like a wedge that becomes narrower from its top toward its bottom in a front view, and like a wedge that becomes wider from its top toward its bottom in a side view; and the heating medium is caused to circulate inside the modules.

This configuration makes the manufacturing easy because the receiver (the heat receiving unit) can be built by three-dimensionally combining the simple modules formed of the heat receiving tubes and the headers. Moreover, this configuration makes the transportation easy, and can suppress a transportation cost, since the receiver can be transported by being broken down into the modules. Meanwhile, the configuration makes it possible to assemble the heat receiving unit easily in the case of constructing the unit on site. Further, the configuration makes repair work easy, and can reduce the costs for spare parts, in the case of a failure of the receiver due to pipe breakage or the like, because the repair is completed by replacing only a target module instead of the entire receiver.

In addition, uneven application of heat by the solar light can be suppressed by coupling the multiple modules into separate systems instead of coupling the modules into one system. In other words, unevenness in the temperature in the receiver can be suppressed by controlling so as to increase a flow rate of the heating medium in a module where the temperature is rising, and to decrease a flow rate of the heating medium in a module where the temperature is not so high.

Moreover, the structure utilizing the trapezoid-shaped module, which is shaped substantially like a trapezoid in a front view, increases the degree of freedom of a three-dimensional shape when the receiver is formed. In other words, when a receiver in the form of a truncated pyramid whose upper part is spread and whose lower part is narrowed, is assembled, the trapezoid-shaped modules make it possible to assemble the receiver with no gaps between the modules. As a consequence, energy can be extracted efficiently without allowing the solar light incident on the receiver to escape.

Further, the shape of the module can be modified without changing the flow rate of the heating medium circulating inside the heat receiving tube, when the shape of the heat receiving tube is modified while keeping the cross-sectional area of the heat receiving tube constant. For example, when an upper header side of the heat receiving tube is shaped like a circle and a lower header side thereof is shaped like an ellipse, it is possible to arrange the heat receiving tubes closely along the direction of a minor axis of the ellipse.

In this respect, when the cross-sectional area of the heat receiving tube is kept constant, it is possible to solve a problem that, for example, if the trapezoid-shaped module is built while making the cross-sectional area of the heat receiving tube smaller in its the lower header side than in its upper header side, a narrowed flow path raises the flow rate of the heating medium, whereby the heating medium flows past the heat receiving tube before the heating medium sufficiently receives the heat from the solar light. On the other hand, it is possible to solve a problem that a rapid rise in the temperature of the heating medium occurs in the tube where the flow rate is low.

In addition, it is possible to receive the solar light efficiently by connecting the trapezoid-shaped modules and forming the receiver shaped like a truncated pyramid that is spread upward. Moreover, since the direction of the flow of the heating medium becomes vertical, the heating medium can be recovered quickly from the inside of the receiver by means of its own weight in case of an emergency.

The solar light concentrating system is characterized in that: at least a part of the multiple modules constituting the heat receiving unit is a curved module; and the curved module includes an upper header curved in a way that makes the upper header constitute a part of a circular arc, and a lower header curved in a way that makes the lower header constitute a part of a circular arc.

This configuration makes it possible to obtain operation and effects similar to those of the above-described trapezoid-shaped module. In addition, the configuration makes it possible to build the receiver in the form of a circular truncated cone by using the curved modules.

The solar light concentrating system is characterized in that the heat receiving unit formed by three-dimensionally combining the foregoing modules is shaped like a basket having an open portion in its upper part.

This configuration makes it possible to receive the reflected light (the solar light) off the center reflector by use of the wide open portion, and to reflect the reflected light incident from the open portion again inside the receiver built in the form of a basket. Hence, the solar energy can be efficiently recovered by the heating medium circulating inside the receiver.

The above-described solar light concentrating system is also characterized in that the heat receiving unit shaped like a truncated pyramid is formed by connecting the upper headers of the multiple trapezoid-shaped modules to one another in a way that makes the upper headers form a circuit, and by similarly connecting the lower headers thereof to one another in a way that makes the lower headers form a circuit.

Alternatively, the solar light concentrating system is characterized in that the heat receiving unit shaped like a circular truncated cone is formed by connecting the upper headers of the multiple curved modules to one another in a way that makes the upper headers form a circuit, and by similarly connecting the lower headers thereof to one another in a way that makes the lower header form a circuit.

These configurations makes it possible to provide a receiver which realizes suppression of a manufacturing cost, a transportation cost and the like, and which has efficiency of solar energy recovery equivalent to or greater than that of a conventional receiver.

Effects of the Invention

A solar light concentrating system of the present invention provides itself as a solar light concentrating system which realizes suppression of power generation costs by applying a receiver that is capable of suppressing a manufacturing cost to a low level, facilitating recovery work when a failure occurs, and quickly recovering a heating medium circulating inside in case of an emergency.

BRIEF DESCRIPTION OF THE DRAWINGS

FIG. 3 is a diagram showing an outline of a trapezoid-shaped module according to the embodiment of the present invention.

FIG. 4 is a schematic diagram showing a truncated pyramid type receiver according to a different embodiment of the present invention.

MODES FOR CARRYING OUT THE INVENTION

Figure 1:
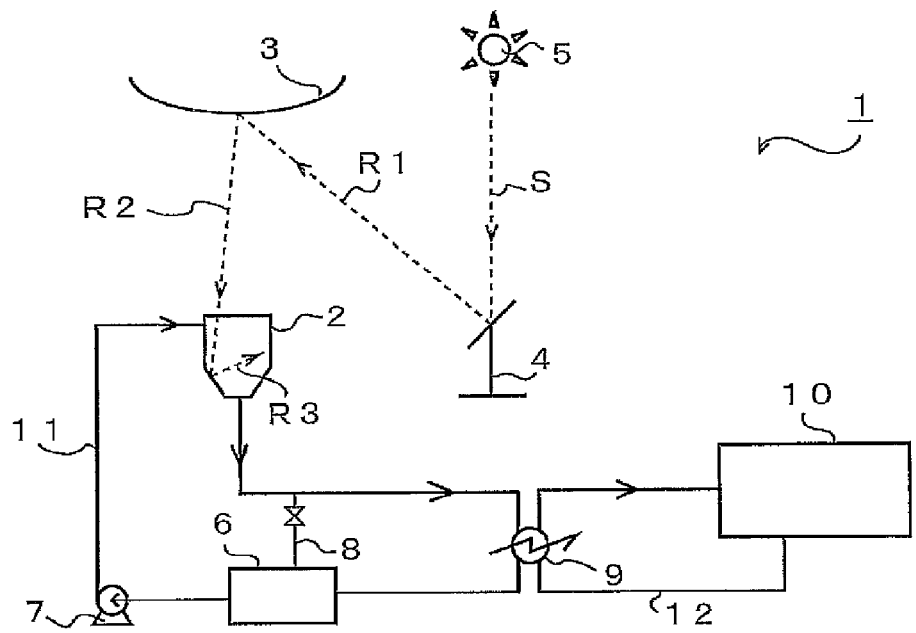
FIG. 1 is a diagram showing an outline of a solar light concentrating system according to an embodiment of the present invention.

A receiver (a heat receiving unit) in a solar light concentrating system and a manufacturing method thereof according to an embodiment of the present invention will be described below by referring to the accompanying drawings. FIG. 1 shows a configuration of a beam-down type solar light concentrating system 1 according to the embodiment of the present invention. The following description will be given of the beam-down type solar light concentrating system. However, in addition thereto, the present invention is also applicable to a tower-type solar light concentrating system in which a receiver is installed on an upper part of a tower-like building.

First, an outline of the solar light concentrating system 1 will be described. In the solar light concentrating system 1, solar light S radiated from the sun 5 is reflected (reflected light R1) by a heliostat (a reflecting mirror) 4, then reflected again (reflected light R2) by a center reflector (a large reflecting mirror) 3, and concentrated onto a receiver (a heat receiving unit) 2. The solar light repeatedly reflected (reflected light R3) inside this receiver 2. The system 1 is configured to absorb the heat energy possessed by the solar light by using a heating medium circulating in the receiver 2.

This heating medium is supplied from a heating medium tank 6 to the receiver 2 through a pump 7 and a heating medium line 11. Moreover, the heating medium having absorbed the energy of the solar light in the receiver 2 is designed to be returned to the heating medium tank 6 through a heat exchanger 9.

This heat exchanger 9 transfers the thermal energy possessed by the heating medium to water circulating in a steam line 12. This water (steam) is designed to be supplied to a steam power generator 10 provided with a steam turbine and the like in order to generate power.

Meanwhile, for example, when fused salt made of sodium nitrate or the like is used as the heating medium, the system 1 may perform control so as to recover all the fused salt into the heating medium tank 6 after sunset. This control is intended for avoiding a problem that the fused salt gets solidified and forms a clog inside the receiver 2 or other places due to a drop in the temperature of the receiver 2 after the sunset.

Moreover, when the heating medium needs to be recovered urgently due to rapid weather change (in cloudy weather), breakage of the receiver 2 or the like, the heating medium is designed to be capable of being recovered into the heating medium tank 6 by use of an emergency line 8. In this respect, it is preferable to install the heating medium tank 6 in a lower position than the receiver 2, and to establish a positional relationship that makes the heating medium capable of being recovered into the tank 6 by way of the gravity.

Next, descriptions will be provided for a structure of the receiver 2 which the present invention adopts in order to improve power generation efficiency of the beam-down type solar light concentrating system 1 and to realize reduction in transportation, installation, and repair costs for the system. Note that the present invention forms the receiver 2 as a combination of multiple modules 20.

Figure 2:
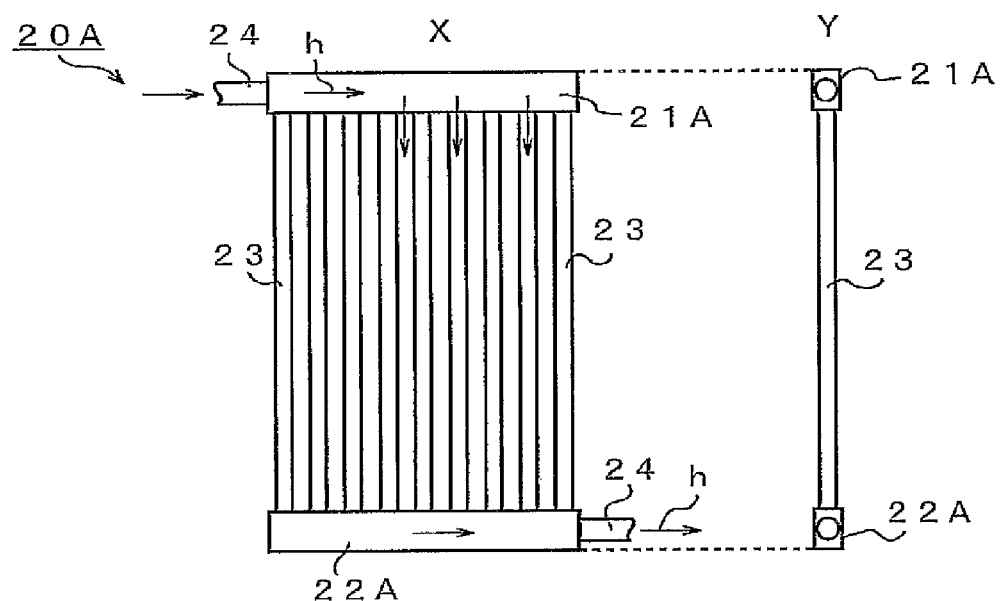
FIG. 2 is a diagram showing an outline of a plate-shaped module according to the embodiment of the present invention.

FIG. 2 shows a plate-shaped module 20A as an example of one of the modules 20 constituting the receiver 2, which depicts outlines of a front X and a side Y. This plate-shaped module 20A is configured to make a heating medium h, which is accepted from a connection tube 24, flow from an upper header 21A to a lower header 22A through heat receiving tubes 23, and then to supply the heating medium h to the next module through a connection tube 24. Note that arrows indicate the flow of the heating medium h.

In this respect, the connection tubes 24 are illustrated beside the headers 21, 22. However, the connection tubes 24 can be changed to the top or underneath of the headers depending on the direction of connection of the module 20A.

Moreover, clearances are illustrated between the heat receiving tubes 23 for the sake of convenience. However, efficiency of recovering the heat from the solar light is increased by setting the clearances as narrow as possible. Nevertheless, because the temperature of the receiver 2 in the beam-down solar light concentrating system 1 may reach a high temperature in a range of 600° C. to 700° C., it is still necessary to leave adequate clearances wide enough to avoid destruction of the heat receiving tubes 23 due to expansion.

FIG. 3 shows a trapezoid-shaped module 20B as a different example of one of the modules constituting the receiver 2, which depicts outlines of the front X, the side Y, and cross sections of the heat receiving tube 23. This trapezoid-shaped module 20B includes an upper header 21B, a lower header 22B that is shorter than the upper header 22B, and multiple heat receiving tubes 23 to connect the two headers 21B, 22B. The entire module is shaped substantially like a trapezoid in a front view X. The heat receiving tubes 23 are formed by successively altering their cross-sectional shapes in a way that makes each heat receiving tube 23 shaped like a wedge that becomes narrower from the upper header 21B toward the lower header 22B in the front view X, and like a wedge that becomes wider from the upper header 21B toward the lower header 22B in a side view Y.

That is to say, as shown in FIG. 3, when an upper cross section 18 of the heat receiving tube 23 is shaped like a circle and a lower cross section 19 thereof is shaped like an ellipse (the ellipse which is shorter in a right-left direction and longer in a depth direction in the front view X in FIG. 3), the shape of the module can be modified so as for the module to be shaped like a trapezoid or the like while keeping the cross-sectional area of the heat receiving tube 23 constant.

When the cross-sectional area of the heat receiving tube 23 is kept constant, the flow rate of the heating medium h flowing inside becomes constant in the heat receiving tube 23, whereby the heating of the heating medium h by the solar light becomes efficient. Moreover, imposition of an extra load to the pump 7 for circulating the heating medium h is prevented.

Moreover, in case of an emergency such as a failure of the pump 7 for circulating the heating medium or rapid weather change (a drop in the ambient temperature), the heating medium h needs to be recovered into the heating medium tank 6 through the emergency line 8 by causing the heating medium h to fall from the receiver 2 by way of the own weight. At this time, the flow of the heating medium h would encounter resistance, if the tube diameter of the heat receiving tube 23 would become narrower in and after the middle of the heat receiving tube 23. However, this problem does not occur as long as the cross-sectional are is constant. Hence, it is possible to recover the heating medium h quickly. Incidentally, the trapezoid-shaped module 20B is illustrated with clearances provided between the heat receiving tubes 23 for the same reason as is the plate-shaped module 20A.

FIG. 4 shows a truncated pyramid type receiver 2B using the trapezoid-shaped modules 20B, in which some of the trapezoid-shaped modules 20B are roughly illustrated by using frame lines only. This truncated pyramid type receiver 2B is formed by combining six trapezoid-shaped modules 20B. In this respect, the upper headers 21B are connected to one another in a way that makes the upper headers 21B form a circuit (in a hexagonal shape), and the lower headers 22B are similarly connected to one another in a way that makes the lower headers 22B form a circuit (in a hexagonal shape).

This configuration causes the solar light incident from an open portion 25 at an upper part to be repeatedly reflected inside the receiver 2B so that the solar heat can be efficiently absorbed by the heating medium h. Moreover, when the direction of the flow of the heating medium h is set substantially in a vertical direction, the heating medium h can be recovered easily and quickly in case of an emergency.

Here, a flow path of the heating medium h may be built as a single system by connecting all of the modules 20B to one another, or as multiple systems. An increase in the number of systems makes it possible to perform control so as to homogenize thermal distribution in the receiver 2B. On the other hand, a reduction in the number of systems leads to a reduction in the number of pumps for conveying the heating medium h, and makes it possible to simplify the solar light concentrating system 1 itself.

Note that the number of the trapezoid-shaped modules 20B to be connected together does not have to be limited to six. It is possible to form the receiver 2 by an arbitrary combination depending on the form of the trapezoid-shaped modules.

Figure 5:
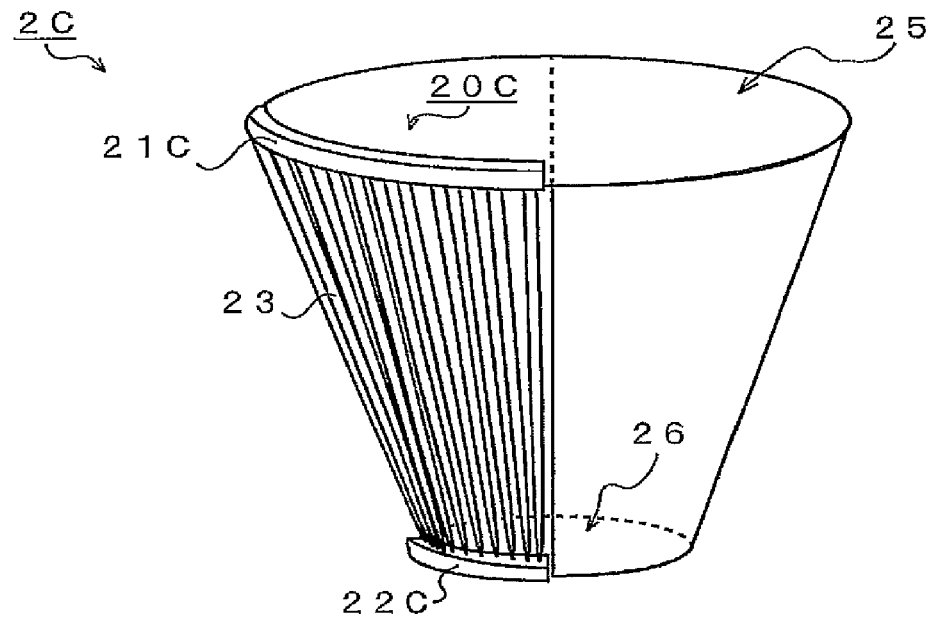
FIG. 5 is a schematic diagram showing a circular truncated cone type receiver according to a different embodiment of the present invention.

FIG. 5 shows a circular truncated cone type receiver 2C using curved modules 20C, in which some of the curved module 20C are roughly illustrated by using frame lines only. This circular truncated cone type receiver 2C is formed by combining six curved modules 20C. In this respect, the upper headers 21C are connected to one another in a way that makes the upper headers 21C form a circuit, and the lower headers 22C are similarly connected to one another in a way that makes the lower headers 22C form a circuit.

This configuration makes it possible to provide the circular truncated cone type receiver 2C which, like the pot-shaped receiver as recited in Patent document 2, is capable of recovering the solar heat at high efficiency, and of considerably reducing all of the manufacturing cost, the transportation cost, the installation cost, and the repair cost.

The headers 21C, 22C of each curved module 20C are formed by dividing a circle into quarters. However, depending on the size of the receiver, the portability can be improved when the curved modules 20c are downsized by increasing the number of partitions. Alternatively, each module may be shaped like one of multiple pieces into which a cylinder is divided, with the lengths of the upper header 21C and the lower header 22C of the curved module 20C set equal to each other.

Figure 6:
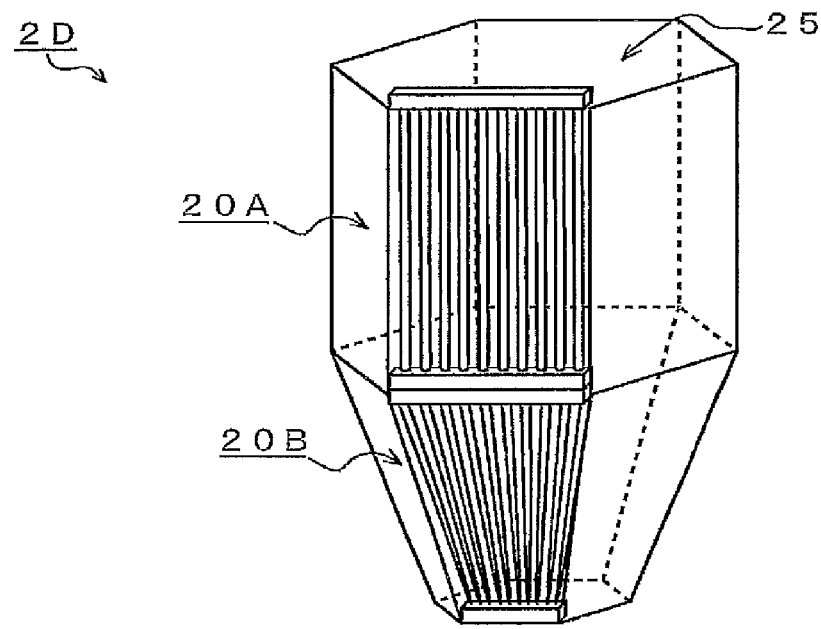
FIG. 6 is a schematic diagram showing a composite receiver according to a different embodiment of the present invention.

FIG. 6 shows an outline of a composite receiver 2D formed by combining the plate-shaped modules 20A and the trapezoid-shaped modules 20B. As shown in FIG. 6, the receiver 2 can be formed by arbitrarily combining the plate-shaped modules 20A, the trapezoid-shaped modules 20B or the curved modules 20C.

It should be noted that heat insulating materials 29 may be placed on back faces 28 (the opposite side of solar light receiving faces 27) of the modules 20A, 20B constituting the receiver. The heat insulating materials 29 can prevent heat release from the heating medium h circulating inside the modules. Meanwhile, a configuration in which reflecting mirrors are placed on the back faces 28 of the modules 20 may be used. This configuration makes the solar light passing through gaps between the heat receiving tubes 23 and the like capable of being reflected again to the heat receiving tubes 23, and hence makes it possible to improve the efficiency of solar energy recovery. Incidentally, the efficiency of recovery can be further improved when using a reflecting mirror whose paraboloid has its focus on the heat receiving tube 23.

EXPLANATION OF REFERENCE NUMERALS 1 beam-down type solar light concentrating system
2 receiver (heat receiving unit)
2B truncated pyramid type receiver
2C circular truncated cone type receiver
2D composite receiver
3 center reflector
4 heliostat
20 module
20A plate-shaped module
20B trapezoid-shaped module
20C curved module
21A, 21B, 21C upper header
22A, 22B, 22C lower header
23 heat receiving tube
24 connecting tube
h heating medium
S solar light
R1 reflected light
R2 secondary reflected light
R3 intra-receiver reflected light

What is claimed is:

1. A solar light concentrating system for extracting energy from a heating medium, comprising:
a heat receiving unit including a plurality of modules combined three-dimensionally, in which at least some of the modules are trapezoid-shaped, wherein:
each trapezoid-shaped module comprises an upper header, a lower header shorter than the upper header, a plurality of heat receiving tubes connecting the two headers together, a solar light receiving face, a back face on an opposite side from the solar light receiving face, and heat insulating material placed on the back face,
the heat receiving tubes of each trapezoid-shaped module having cross-sectional shapes successively altered in a way that each heat receiving tube is shaped like a wedge that becomes narrower from its top toward its bottom in a front view, and like a wedge that becomes wider from its top toward its bottom in a side view, and
a heating medium circulating inside the modules; and
a plurality of heliostats for reflecting solar light to the heat receiving unit.

2. The solar light concentrating system according to claim 1, wherein the modules of the heat receiving unit are combined three-dimensionally in a basket shape having an open portion in an upper part.

3. The solar light concentrating system according to claim 2, wherein side portions of the trapezoid-shaped modules are connected to one another in a truncated pyramid shape.

4. A solar light concentrating system for extracting energy from a heating medium, comprising:
a heat receiving unit including a plurality of modules combined three-dimensionally, in which at least some of the modules are curved, wherein:
each curved module comprises an upper header, a lower header shorter than the upper header, a plurality of heat receiving tubes connecting the two headers together, a solar light receiving face, a back face on an opposite side from the solar light receiving face, and heat insulating material placed on the back face, the upper header being curved in such a way as to constitute a part of a circular arc, and the lower header being curved in such a way as to constitute a part of a circular arc,
the heat receiving tubes a of each curved module having cross-sectional shapes successively altered in a way that each heat receiving tube is shaped like a wedge that becomes narrower from its top toward its bottom in a front view, and like a wedge that becomes wider from its top toward its bottom in a side view, and a heating medium circulating inside the modules; and a plurality of heliostats for reflecting solar light to the heat receiving unit.

5. The solar light concentrating system according to claim 4, wherein other of the modules of the heat receiving unit are combined three-dimensionally in a basket shape having an open portion in an upper part.

6. The solar light concentrating system according to claim 4, wherein side portions of the curved modules are connected to one another in a circular truncated cone shape.

* * * * *